United States Patent
Eshita

(10) Patent No.: US 9,191,896 B2
(45) Date of Patent: Nov. 17, 2015

(54) COMMUNICATION APPARATUS AND COMMUNICATION CONTROL METHOD

(75) Inventor: Shiro Eshita, Tokyo (JP)

(73) Assignee: Sony Corporation, Tokyo (JP)

( * ) Notice: Subject to any disclaimer, the term of this patent is extended or adjusted under 35 U.S.C. 154(b) by 419 days.

(21) Appl. No.: 13/484,798

(22) Filed: May 31, 2012

(65) Prior Publication Data

US 2013/0017787 A1 Jan. 17, 2013

(30) Foreign Application Priority Data

Jul. 11, 2011 (JP) ................................. 2011-152747

(51) Int. Cl.
| | |
|---|---|
| *H04B 7/00* | (2006.01) |
| *H04W 52/02* | (2009.01) |
| *H04W 64/00* | (2009.01) |
| *H04W 76/00* | (2009.01) |
| *H04N 1/00* | (2006.01) |
| *H04W 84/10* | (2009.01) |
| *H04W 84/18* | (2009.01) |
| *H04W 88/02* | (2009.01) |

(52) U.S. Cl.
CPC ....... *H04W 52/0229* (2013.01); *H04N 1/00315* (2013.01); *H04N 1/00323* (2013.01); *H04W 64/00* (2013.01); *H04W 76/00* (2013.01); *H04N 2201/0015* (2013.01); *H04N 2201/0084* (2013.01); *H04W 84/10* (2013.01); *H04W 84/18* (2013.01); *H04W 88/02* (2013.01); *Y02B 60/50* (2013.01)

(58) Field of Classification Search
USPC ............ 455/41.2, 556.1, 557, 574; 348/207.1
See application file for complete search history.

(56) References Cited

U.S. PATENT DOCUMENTS

| | | | | |
|---|---|---|---|---|
| 6,961,594 | B2* | 11/2005 | Rankin | 455/574 |
| 7,685,606 | B2* | 3/2010 | Chang | 719/318 |
| 2007/0073937 | A1* | 3/2007 | Feinberg et al. | 710/62 |
| 2007/0237102 | A1* | 10/2007 | Trott | 370/310 |
| 2007/0249365 | A1* | 10/2007 | Jendbro | 455/456.1 |
| 2008/0122950 | A1* | 5/2008 | Uchiyama | 348/231.99 |
| 2009/0111485 | A1* | 4/2009 | Kitani | 455/456.1 |
| 2009/0163226 | A1* | 6/2009 | Karkaria et al. | 455/456.1 |
| 2009/0221240 | A1* | 9/2009 | Zhang | 455/68 |
| 2010/0079599 | A1* | 4/2010 | Kanma | 348/207.1 |
| 2010/0167792 | A1* | 7/2010 | Chen et al. | 455/566 |
| 2011/0022755 | A1* | 1/2011 | Sueyoshi et al. | 710/109 |

FOREIGN PATENT DOCUMENTS

| | | |
|---|---|---|
| JP | 2008-252212 | 10/2008 |
| JP | 2011-29892 | 2/2011 |

* cited by examiner

*Primary Examiner* — Ankur Jain
(74) *Attorney, Agent, or Firm* — Sony Corporation

(57) ABSTRACT

There is provided a communication apparatus including a short-range wireless communication unit for performing a short-range wireless communication with an external communication device, a position detection unit for detecting current position information, a storage unit for storing a communication position list registering therein position information at a time of performing the short-range wireless communication, and a control unit for acquiring the current position information from the position detection unit and for controlling a generation state of a standby radio signal from the short-range wireless communication unit in accordance with a comparison result obtained by comparing the acquired current position information with the communication position list.

7 Claims, 11 Drawing Sheets

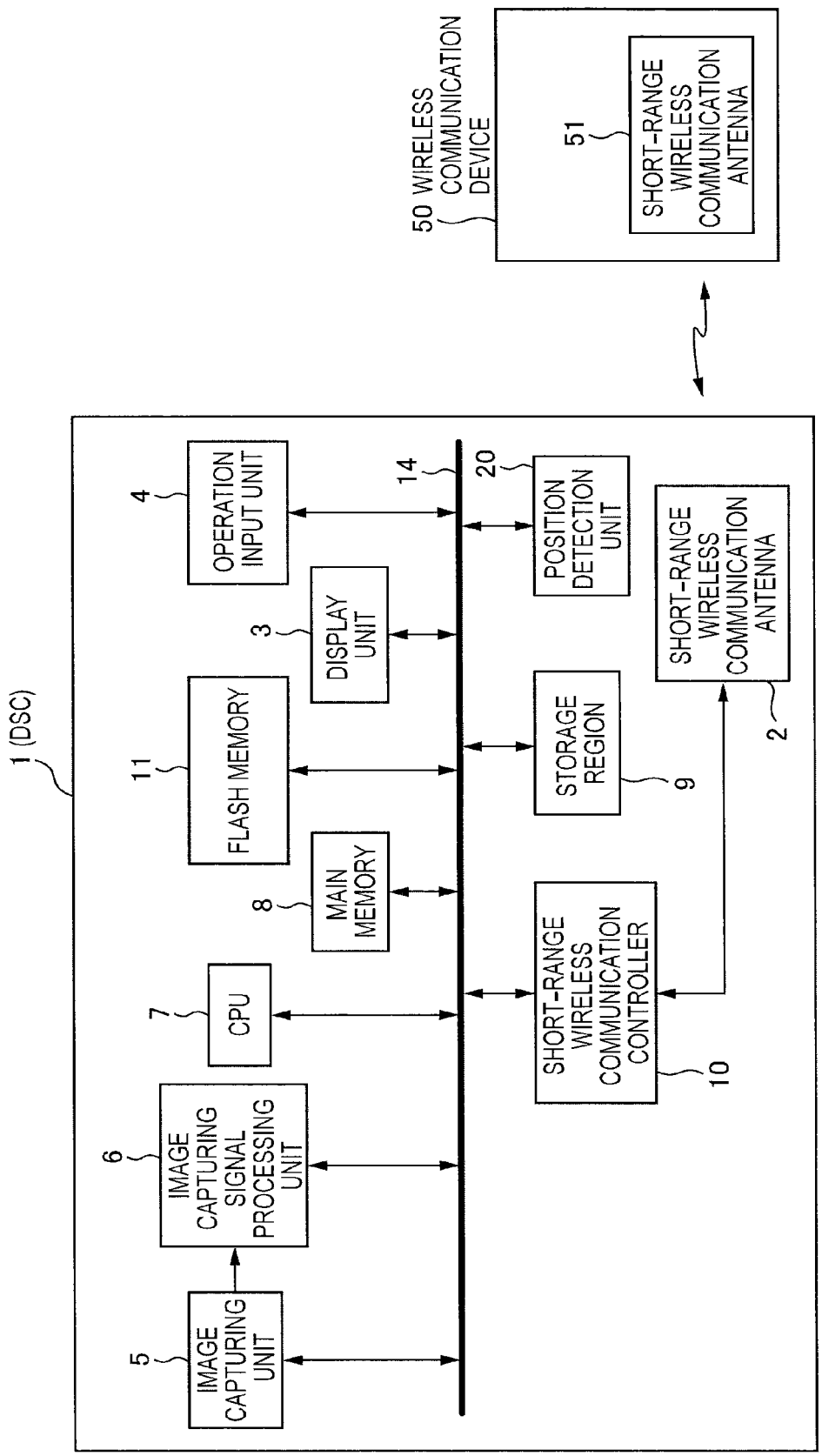

FIG. 4

COMMUNICATION POSITION LIST

|   | LATITUDE | LONGITUDE |
|---|----------|-----------|
| 1 | AAA | BBB |
| 2 | CCC | DDD |
| 3 | EEE | FFF |
| ⋮ | ⋮ | ⋮ |

FIG. 8

COMMUNICATION POSITION LIST

| CONTENTS | LATITUDE | LONGITUDE |
|---|---|---|
| CT1 | AAA | BBB |
| CT2 | — | — |
| CT3 | AAA | BBB |
| | CCC | DDD |
| CT4 | CCC | DDD |
| CT5 | AAA | BBB |
| ⋮ | ⋮ | ⋮ |

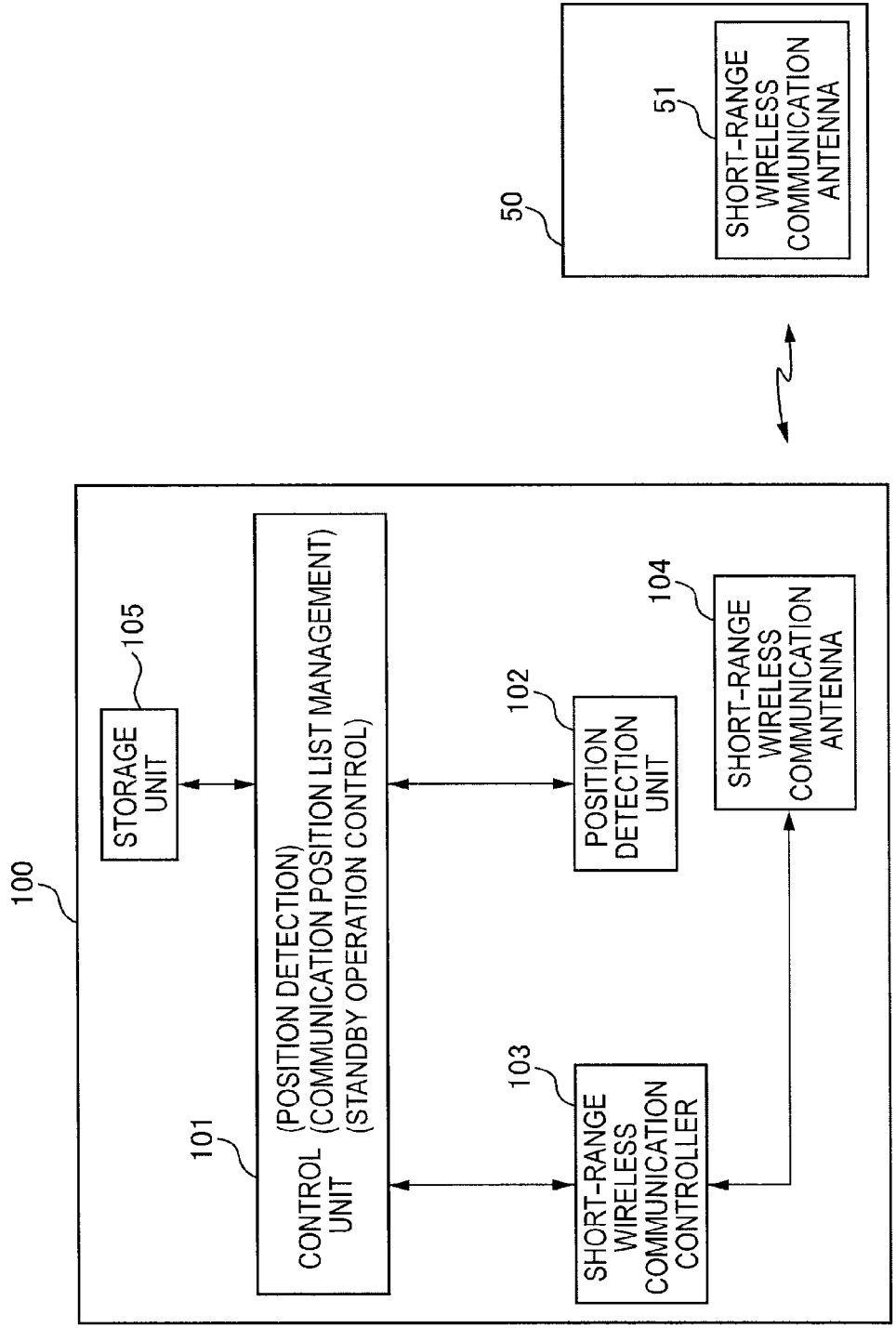

COMMUNICATION APPARATUS AND COMMUNICATION CONTROL METHOD

BACKGROUND

The present disclosure relates to a communication apparatus and communication control method that performs a short-range wireless communication.

A short-range wireless communication technology such as Bluetooth or TransferJet has been known in this field. In the short-range wireless communication, transmission of a radio signal for detection is used in order to detect a communication counterpart capable of wireless communication.

Japanese Patent Application Laid-open Publication No. 2011-29892 (hereinafter referred to as Patent Literature 1) discloses TransferJet as an example of the short-range wireless communication. As described in Patent Literature 1, a radio signal for detecting an opposite communication device is defined as a polling signal, and one communication device sends a polling signal and the other communication device replies a response signal according to the polling signal. The polling signal allows preparation condition when both communication devices initiate a data exchange between them to be decided and also enables processes performed between them to be synchronized. Moreover, the polling signal is discontinuously sent at a given polling interval.

Thus, in the short-range wireless communication, a radio signal for detecting an opposite communication device (referred to herein as "standby radio signal") is periodically transmitted. This periodic transmission of the radio signal is used to automatically detect an opposite communication device and then initiates the communication by bring an originator communication device and the target communication device into close proximity, thereby realizing an intuitive operation feel, particularly in the short-range wireless communication.

SUMMARY

In the short-range wireless communication, only when bring a short-range wireless communication device and an opposite communication device into close proximity or touching them together, the communication between them can be performed, due to short transmission range. If they are not close, the communication will not be performed. Thus, continuous transmission of the standby radio signal causes unnecessary power consumption.

To overcome this situation, when initiating the communication, a method in which a user activates communication functions of the short-range wireless communication device by operating menus and the like, and then brings them into close proximity may be used. In this case, the standby radio signal is sent only when a user attempts to perform the communication, but the user convenience is suffering because of troublesome menu operations.

As a method for avoiding the troublesome menu operation and for reducing the power consumption necessary to communicate, the following method is disclosed in Japanese Patent Application Laid-open Publication No. 2008-252212 (hereinafter referred to as Patent Literature 2).

As described in Patent Literature 2, a short-range wireless communication device has a second wireless communication function (wireless LAN) in addition to the short-range wireless communication having a first wireless communication function. When a user makes a specific operation (shutter key release), the command for activating the short-range wireless communication function is issued to a short-range wireless communication device of a communication counterpart through the second wireless communication function. After the short-range wireless communication is completed, the short-range wireless communication functions between them are terminated. This enables the short-range wireless communication device of a communication counterpart to be activated without causing a user with troublesome operation, thereby reducing the power consumption.

The method disclosed in Patent Literature 2 for reducing the power consumption is based on the premise that the data communication is performed according to user's operation of a shutter key release, and thus this method is used in only a use case that a specific user's operation is carried out. Therefore, in a short-range wireless communication when operations other than the shutter key release are used, the reduction of the power consumption has been not yet achieved.

Furthermore, the method disclosed in Patent Literature 2 for reducing the power consumption uses the second wireless communication function of a wireless LAN to activate the short-range wireless communication, but the communication function is always used in the wireless LAN of the short-range wireless communication device of a communication counterpart, thus the power consumption used in the communication function of the wireless LAN becomes significant.

According to an embodiment of the present disclosure, the power consumption necessary for a connection standby may be reduced without affecting the user convenience in a device performing a short-range wireless communication.

According to an embodiment of the present disclosure, there is provided a communication apparatus which includes a short-range wireless communication unit for performing a short-range wireless communication with an external communication device, a position detection unit for detecting current position information, a storage unit for storing a communication position list registering therein position information at a time of performing the short-range wireless communication, and a control unit for acquiring the current position information from the position detection unit and for controlling a generation state of a standby radio signal from the short-range wireless communication unit in accordance with a comparison result obtained by comparing the acquired current position information with the communication position list.

According to another embodiment of the present disclosure, there is provided a communication control method of controlling a communication apparatus including a short-range wireless communication unit for performing a short-range wireless communication with an external communication device, a position detection unit for detecting current position information, and a storage unit for storing a communication position list registering therein position information at a time of performing the short-range wireless communication, the method includes acquiring current position information from the position detection unit, and controlling a generation state of a standby radio signal from the short-range wireless communication unit in accordance with the comparison result obtained by comparing the acquired current position information with the communication position list.

According to another embodiment of the present disclosure described above, a history of position information (latitude and longitude information) of a location where the communication has been performed is registered on the communication position list, and thus it is possible to determine whether a short-range wireless communication device as a communication counterpart is at the location. That is, it is possible to compare the current position information with the position information registered on the communication position list and determine whether or not the current position is a location where the short-range wireless communication has been performed. Thus, the appropriate generation of the standby radio signal according to the current position can be realized by controlling the generation state of the standby radio signal according to the determination result.

For example, if the current position is a location where the short-range wireless communication has been performed, then the standby radio signal is generated in a dense state because the communication device of the communication counterpart is more likely to exist. If the current position is a location where the short-range wireless communication has not been performed, then the standby radio signal is generated in a sparse state because the opposite communication device is less likely to exist.

According to the embodiments of the present disclosure described above, the power consumption necessary for the standby radio signal can be reduced by controlling the generation state of the standby radio signal according to the comparison result obtained by comparing the current position information with the communication position list. Further, an excessive operation burden will not be given to the user, and thus the convenience of the user can be maintained desirably.

BRIEF DESCRIPTION OF THE DRAWINGS

FIG. 2 is a block diagram illustrating an internal configuration of the digital still camera according to the embodiment;

FIG. 4 is a diagram explaining a communication position list according to a first embodiment of the present disclosure;

FIG. 8 is a diagram explaining a communication position list according to a second embodiment of the present disclosure;

FIG. 11 is a block diagram illustrating exemplary major components of a communication apparatus of the present disclosure.

DETAILED DESCRIPTION OF THE EMBODIMENT(S)

Figure 1A:
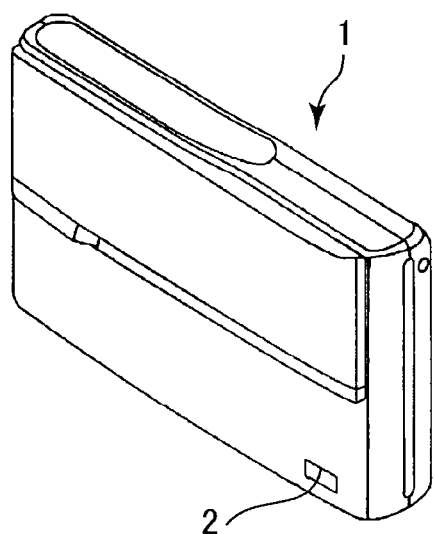
FIG. 1 is a diagram explaining an appearance of a digital still camera according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments of the present disclosure will be described below. The description will be made in the following order. In an embodiment, a digital still camera (hereinafter referred to as "DSC") which performs a short-range wireless communication with an external communication device will be described as an example of a communication apparatus.

1. Configuration of DSC (digital still camera)
2. Communication Control Process of First Embodiment
3. Communication Control Process of Second Embodiment
4. Modification Example 1. Configuration of DSC (Digital Still Camera)

Figure 1B:
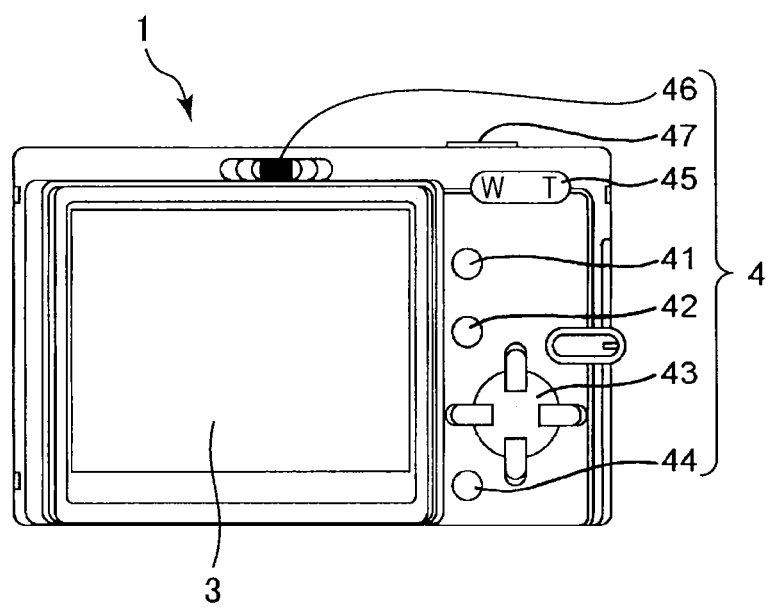

A configuration of DSC according to an embodiment of the present disclosure will be described. FIG. 1A is a front side perspective view illustrating an appearance of a DSC 1 according to an embodiment. FIG. 1B is a rear side (operation side) plan view illustrating an appearance of the DSC 1.

The DSC 1, as shown in FIG. 1A, includes a short-range wireless communication antenna 2 at a lower part of the front side. In this embodiment, although the DSC 1 includes the short-range wireless communication antenna 2, the DSC 1 may be configured to include a removable (detachable) communication module (a module including a short-range wireless communication controller 10 or a storage region for communication, which will be described later) which is equipped with the short-range wireless communication antenna 2.

The DSC 1, as shown in FIG. 1B, includes a display unit 3 on the rear surface. The display unit 3 may be configured to include a liquid crystal display (LCD), an organic electroluminescence (EL) display, or similar display device.

Operating portions constituting an operation input unit 4 are also provided to the DSC 1. The operating portions may include a playback menu start button 41, a decision button 42, a cross key 43, a cancel button 44, a zoom key 45, a slide key 46, a shutter button 47, and so on.

FIG. 2 is a block diagram illustrating an internal configuration of the DSC 1 and a state that the DSC 1 and other electronic device (wireless communication device 50) are connected to each other using a short-range wireless communication.

As shown in FIG. 2, the DSC 1 and the wireless communication device 50 can connect and communicate with each other using a short-range wireless communication. As an example of the short-range wireless communication, in addition to Bluetooth or TransferJet, other short-range wireless communication technologies may be used.

The DSC 1 includes an image capturing unit 5, an image capturing signal processing unit 6, a central processing unit (CPU) 7, a main memory 8, a storage region 9, a short-range wireless communication controller 10, a flash memory 11, and a position detection unit 20, in addition to the short-range wireless communication antenna 2, the display unit 3 and the operation input unit 4, shown in FIG. 1. These components can transmit and receive control signals or image capturing data between each other through a system bus 14.

The short-range wireless communication antenna 2, the storage region 9, and the short-range wireless communication controller 10 may be separately provided as a removable module without being embedded into the DSC 1.

The image capturing unit 5 includes image sensors, a lens system, a drive mechanism, and a diaphragm mechanism. The image sensors receive a light reflected from a subject and convert the received light into electrical signals. The lens system condenses a light reflected from the subject onto the image sensors. The drive and diaphragm mechanisms perform a focusing or zooming by moving a lens.

The components of the image capturing unit 5 are driven in response to a control signal from the CPU 7.

The image sensors may be a charge coupled device (CCD), a complementary metal oxide semiconductor (CMOS), and so on.

The image capturing signal processing unit 6 performs an analog-digital (A/D) conversion, the ISO gain setting, and other various signal processes on the electrical signal obtained by the image sensors of the image capturing unit 5, thereby generating the image capturing signal.

The image capturing signal processing unit 6 may create an image file including a still or moving image by performing a compression process or similar process on the image capturing signal. The image capturing signal processing unit 6 may transmit a through image to the display unit 3 on which the through image is displayed.

The display unit 3 displays an image before capturing a subject (a through image), contents such as a captured still or moving image file, a menu for operation (graphical user interface: GUI), and so on, in response to a control signal from the CPU 7.

The operation input unit 4 functions as an input means for inputting user operations and sends a signal according to the inputted operation to the CPU 7 and so on. The various operating portions as the operation input unit 4 are shown in FIG. 1, but it also may be possible to provide a touch panel in which the operation input unit 4 is integrated with the display unit 3.

The main memory 8 may be a volatile memory such as a random access memory (RAM). The main memory 8 also temporarily stores data or program as a working area when various data is processed by the CPU 7. For example, when an image data is processed in the image capturing signal processing unit at a timing the shutter button is pressed, the image data is read out by the main memory 8 and then written to the storage region 9.

The flash memory (non-volatile memory) 11 stores an operation system (OS) for controlling the components, applications necessary to communicate using the short-range wireless communication, or the like, except for contents files such as an image file.

The storage region 9 may be a non-volatile memory and functions as storage means for storing contents files such as an image file, attribute information and thumbnail image of the image file, and so on. The image file is stored in the form of a joint photographic experts group (JPEG), a tagged image file format (TIFF), a graphics interchange format (GIF), and so on.

The storage region 9 may be in the form of a memory card detachably connected to the DSC 1 or may be embedded into the DSC 1. For example, the storage region 9 may be implemented as a portable flash memory, a hard disk drive (HDD), or the like.

In an embodiment, a communication position list to be described later may be stored. The communication position list is updated and managed by the CPU 7, and is referred to when a communication control is processed. This communication position list may be stored in the storage region 9. Alternatively, the flash memory 11 may be used to store the communication position list.

The short-range wireless communication antenna 2 receives radio signals emitted from other electronic devices and converts the radio signals into signals. The short-range wireless communication antenna 2 also performs a transmission of a standby radio signal or a transmission of a wireless radio wave signal to send data to other electronic devices.

The short-range wireless communication controller 10 controls the transmission or reception of signals using the short-range wireless communication antenna 2 based on a connection protocol of the short-range wireless communication in cooperation with the CPU 7.

The position detection unit 20 can acquire latitude and longitude information as the current position of the DSC 1. The position detection unit 20 may be configured to include a global positioning system (GPS) receiving device. For example, the CPU 7 can acquire the latitude and longitude information by reading out it from a register or memory in the GPS receiving device and can use the acquired information in a variety of applications.

The CPU 7 generally controls the entire DSC 1 by executing the program stored in the flash memory 11 or similar memory device.

For example, the CPU 7 may control operations of the units including an image capturing operation, a playback operation of a captured image file, and a short-range wireless communication operation with an external device, and so on, according to user operations.

The system bus 14 can connect the units such as the CPU 7 to each other and allows the units to exchange signals between each other.

The wireless communication device 50 which performs the short-range wireless communication with the DSC 1 includes a short-range wireless communication antenna 51. The wireless communication device 50 also includes units capable of processing information, in addition to the short-range wireless communication antenna 51. The units capable of processing information may include a CPU, a ROM, a RAM, a display unit, an operation input unit, and so on, which are not shown.

The signal which is received by the wireless communication device 50 is converted through the short-range wireless communication antenna 51. For the signals, an arithmetic process or the like is performed by the CPU. This allows the wireless communication device 50 to be connected to the DSC 1 using the short-range wireless communication and to establish the communication. In this case, the DSC 1 is in a standby state, which will be described later. In the state that the communication between them is established, the DSC 1 can transmit information such as contents data included in the DSC 1 to the wireless communication device 50.

2. Communication Control Process of First Embodiment

A communication control process of the first embodiment will be described with reference to a short-range wireless communication operation by the DSC 1.

Figure 3:
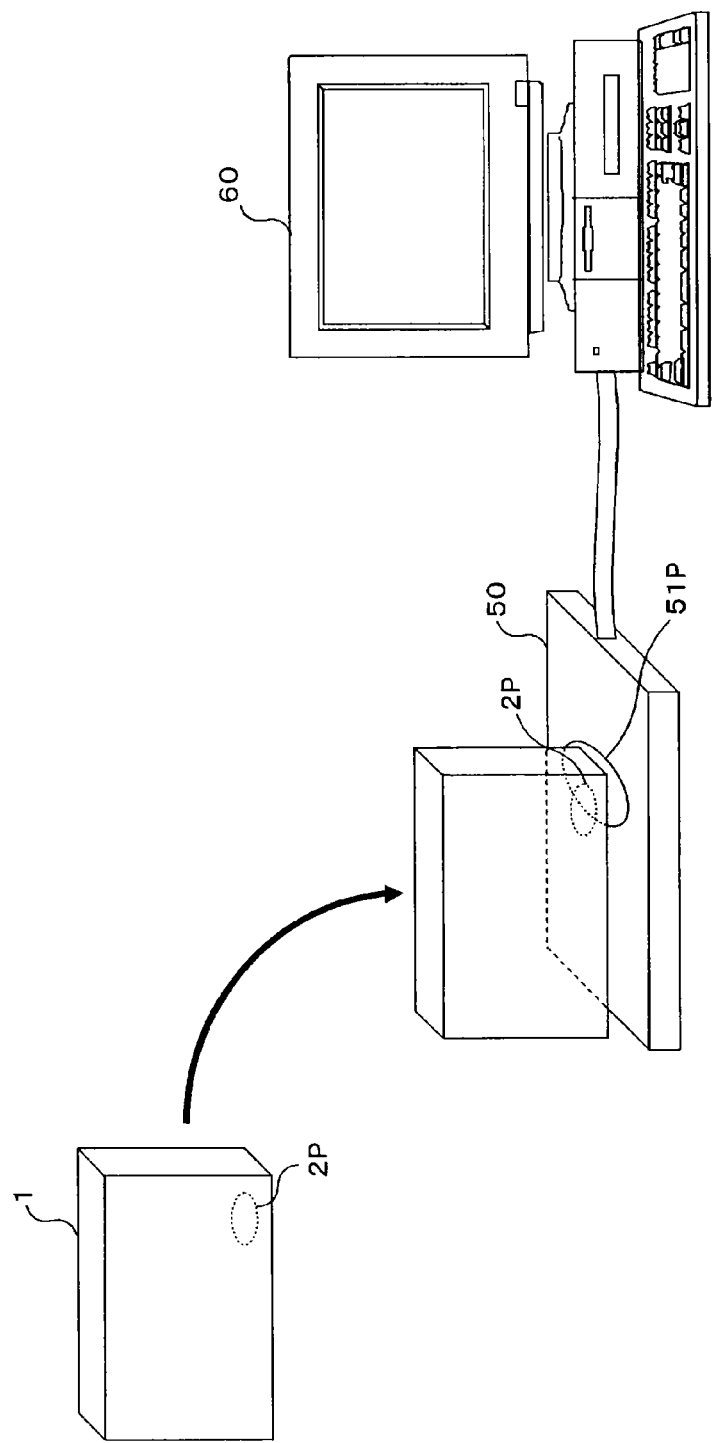
FIG. 3 is a diagram explaining a close proximity operation according to the embodiment.

FIG. 3 schematically illustrates the DSC 1 and the wireless communication device 50. The DSC 1 can be placed on the wireless communication device 50. In the state that the DSC 1 is placed on the wireless communication device 50, the short-range wireless communication is performed between the DSC 1 and the wireless communication device 50.

When a user tries to establish a communication connection between the DSC 1 and the wireless communication device 50 of a communication counterpart, as shown in FIG. 3, the communication initiates by placing the DSC 1 on the wireless communication device 50 and by causing the DSC 1 to be close to the wireless communication device 50.

Since the communication between the communication devices may not be maintained when they are not sufficiently close to each other in the short-range wireless communication, a method of initiating the communication in the state that the DSC 1 is placed on the wireless communication device 50 is commonly used. In this case, it may be impractical that the user continues to hold the DSC 1.

The operation in which a user holds the DSC 1 and places on the wireless communication device 50 to communicate between them is referred to as "proximity operation" hereinafter.

In addition, in the short-range wireless communication, it is necessary for the devices to be close to each other, more specifically, it is necessary for the antennas of the devices to be close to each other. In the drawings, a position where the short-range wireless communication antenna 2 of the DSC 1 is placed in an enclosure is indicated as an antenna position 2P, and a position where the short-range wireless communication antenna 51 of the wireless communication device 50 is placed is indicated as an antenna position 51P. The communication between the devices is performed by placing the devices close to each other.

Furthermore, as shown in FIG. 3, the wireless communication device 50 is connected to a personal computer 60 by any communication means (for example, a universal serial bus: USB).

If a user attempts to make a backup of contents data stored in the DSC 1, the user can conduct the proximity operation and perform the short-range wireless communication between the devices. This allows the contents data of the DSC 1 to be transmitted to the wireless communication device 50. The personal computer 60 saves the contents data received by the wireless communication device 50 in a storage device (for example, a hard disk drive: HDD) (not shown in the figure) of the personal computer 60. This allows the user to make a backup of the contents data of the DSC 1 in the personal computer 60.

The contents data may be a still or moving image data file which is stored, for example, in the storage device 9 of the DSC 1. In other words, the contents data may be a photograph (still image) or moving image taken using the DSC 1.

The personal computer 60 is only an exemplary device for storing the contents data transmitted from the DSC 1, for the purpose of backup. A device which is connected with the wireless communication device 50 may be configured to include a storage device for storing contents data transmitted from the DSC 1. If a storage device function and communication means for communicating with the wireless communication device 50 is provided, other configurations are possible in addition to the personal computer 60.

Moreover, the wireless communication device 50 may be embedded into the personal computer 60 or similar device, such as a tablet personal computer. In this case, the wireless communication can be established by placing the DSC 1 close to the device embedded into the wireless communication device 50. Also, a device which can store the contents data transmitted from the DSC 1 may be used as the wireless communication device.

As an example, in order to make a backup of contents data such as a still image captured with the DSC 1 by a user, a use case of transmitting and storing the contents data to the personal computer 60 using the short-range wireless communication may be considered.

In other words, it is considered that the short-range wireless communication is established between a portable device stored with contents data including a photograph or moving image, such as the DSC 1, and an information processing device paced in user's home or office, such as the wireless communication device 50 and the personal computer 60.

An operation according to the first embodiment will be described.

In the first embodiment, when a short-range wireless communication is established between the DSC 1 and the wireless communication device 50, a user can acquire latitude and longitude information by the position detection unit 20 and store the information, for example, in the storage region 9 of the DSC 1. This allows the latitude and longitude information of one or more positions where the short-range wireless communication has been performed to be registered on a communication position list.

An example of the communication position list is illustrated in FIG. 4. As shown in FIG. 4, three pieces of latitude and longitude information are registered, as positions where the short-range wireless communication has been performed.

The latitude and longitude information registered on the communication position list may be location information which is estimated that the short-range wireless communication will be probably performed in the future.

This is because a backup destination device is placed at a location where the communication between the DSC 1 and the wireless communication device 50 is performed in a use case that contents data of the DSC 1 is made a backup. In this case, the DSC 1 may be portable device capable of the short-range wireless communication. A user typically uses one or several particular backup devices to make a backup. Thus, at a location where the short-range wireless communications has been performed, a communication is more likely to be performed in a case that a backup will be made in the future.

For this reason, it is possible to predict whether or not a user tries to perform the short-range wireless communication based on latitude and longitude information which has been obtained and registered on the communication position list.

More specifically, when the latitude and longitude information obtained by the DSC 1 in the present is coincide with any one of the latitude and longitude information history registered on the communication position list in the past, a user is more likely to perform the short-range wireless communication. Therefore, in this case, the CPU 7 controls the short-range wireless communication controller 10 to send a standby radio signal in a sparse (coarse) state and establish the short-range wireless communication with the wireless communication device 50.

On the other hand, when the latitude and longitude information obtained by the DSC 1 in the present is not coincided with any one of the latitude and longitude information history has been registered on the communication position list in the past, it is less likely to perform the short-range wireless communication. In this case, the CPU 7 controls the short-range wireless communication controller 10 to set the standby radio signal to be in a dense (fine) state.

The standby radio signal of a dense state indicates that a period interval sending the standby radio signal (polling interval) is shortened.

Also, the standby radio signal of a sparse state indicates that a period interval sending the standby radio signal is lengthened.

The short-range wireless communication device periodically sends the standby radio signal used to detect a communication counterpart. In a period (polling interval) which sends the standby radio signal, there is a complementary relationship between the detection of the communication counterpart and the power consumption necessary to send the signal.

Figure 7A:
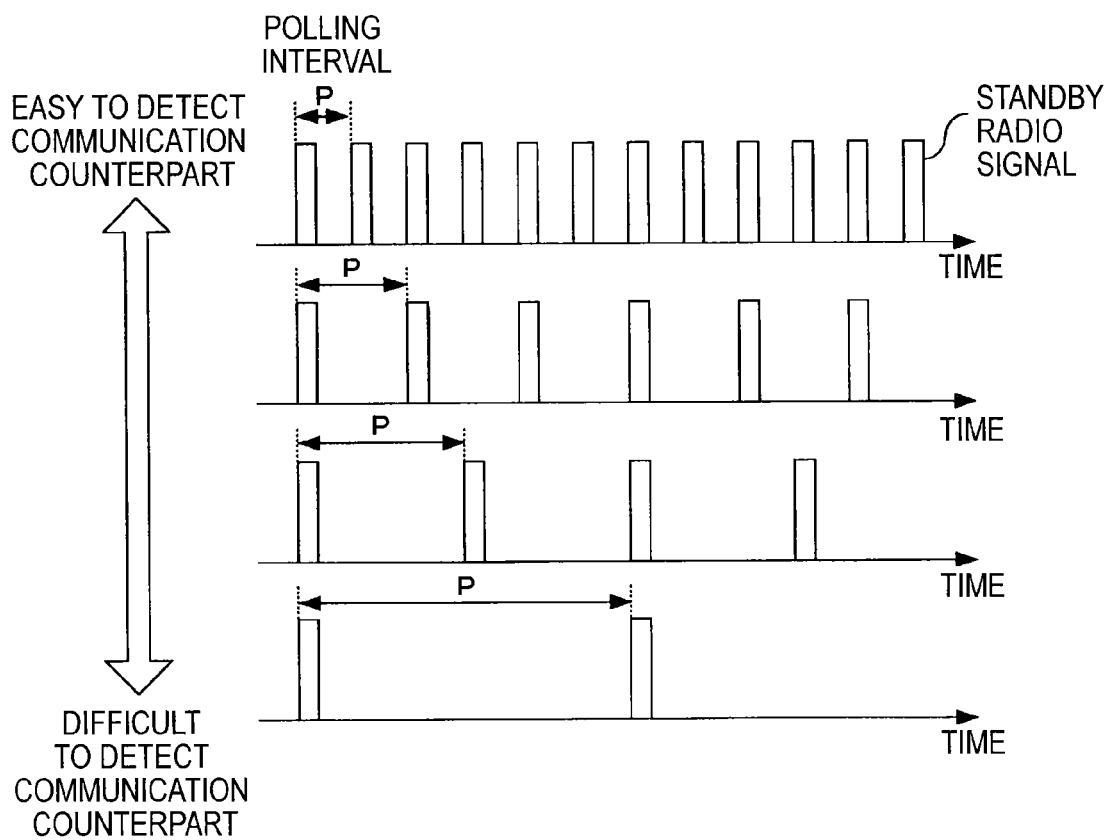
FIG. 7 illustrates a relationship between polling interval and power consumption.

FIG. 7A illustrates a state that a radio signal for detecting a communication counterpart is sent in a variety of intervals. In the FIG. 7A, in a case that a polling interval P is relatively short, the number of times of sending a radio signal is large in a given time period, and thus the probability of detecting a communication counterpart becomes high. Whereas, in a case when a polling interval P is relatively long, the number of times of sending a radio signal is small in a given time period, and thus the probability to detect a communication counterpart becomes low.

Figure 7B:
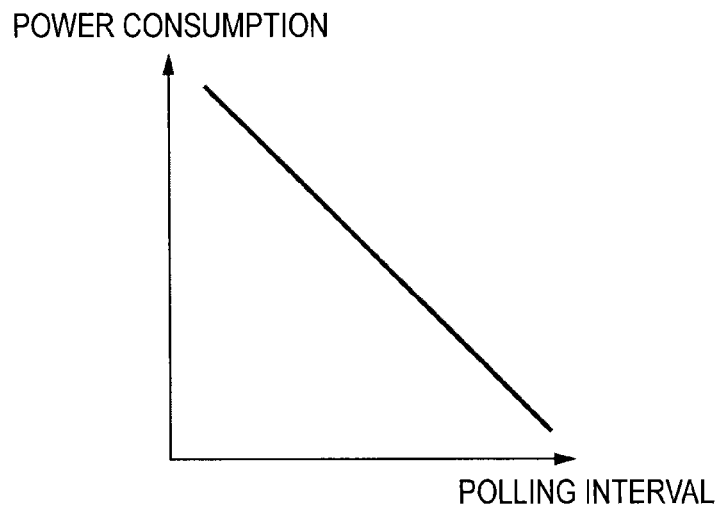

FIG. 7B illustrates a relationship between a polling interval and power consumption. In a case that a polling interval is relatively short, the number of times of sending a radio signal is large in a given time period, and thus power consumption becomes increased. Whereas, in a case that a polling interval is relatively long, the number of times of sending a radio signal is small in a given time period, and thus power consumption becomes decreased.

That is, in a case of a "dense state" at which a polling interval is short, the connection with a communication counterpart is easy, but power consumption becomes increased. In a case of a "sparse state" at which a polling interval is long, the connection with a communication counterpart is difficult, but power consumption becomes decreased.

As an example, values of specific polling interval P in sparse and dense states can be set according to the properties or functionalities of devices. The sparse and dense states indicate states that the polling interval P is shortened or lengthened by the DSC 1 of the present embodiment, respectively. There is no limit on the value of specific polling interval.

An operation of the first embodiment will be described in detail as a process example of the CPU 7.

Figure 5B:
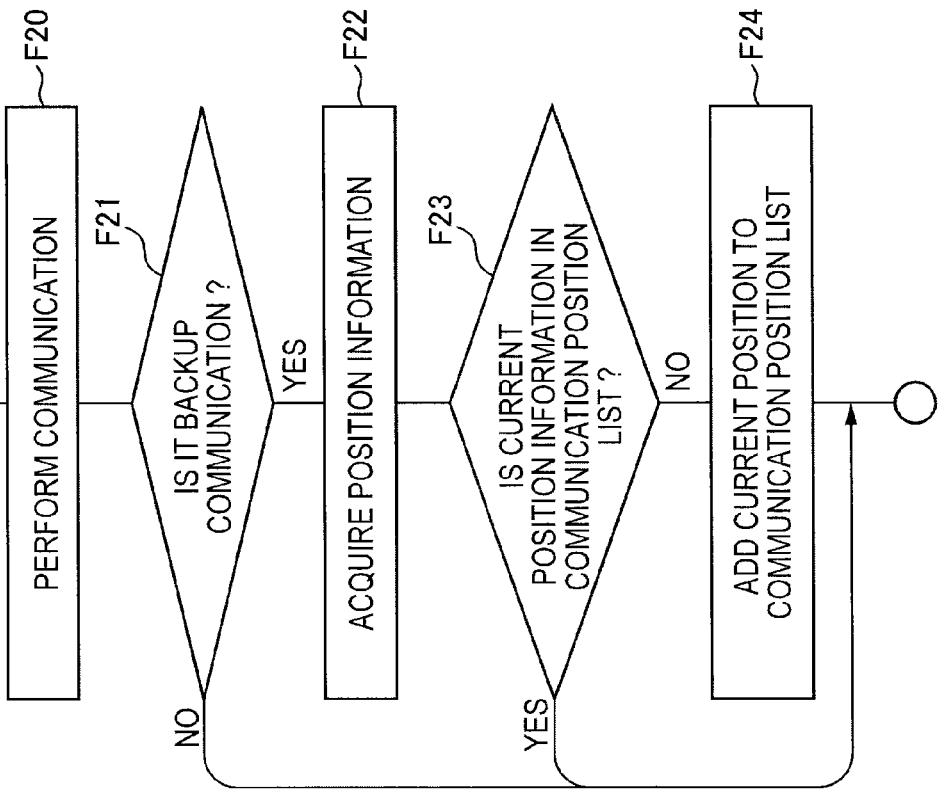
FIG. 5 is a flowchart illustrating a list management process according to the first embodiment.
Figure 5A:
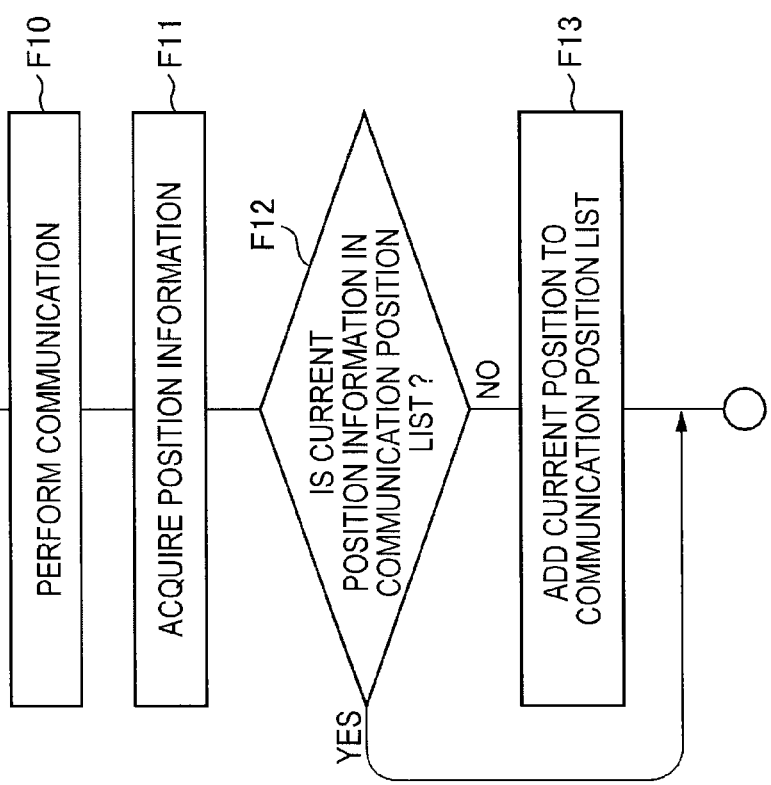

FIG. 5A and FIG. 5B illustrate management process examples of a communication position list carried out according to the implementation of the short-range wireless communication.

Flowcharts illustrated in FIG. 5 and FIG. 6 (detailed later) will be described as a control process of the CPU 7 based on a program executed by the CPU 7, but a similar process may be implemented in hardware or a combination of hardware and software.

An example of FIG. 5A will be first described. In step F10, the CPU 7 controls the short-range wireless communication controller 10 to actually perform a short-range wireless communication.

When the short-range wireless communication is performed in step F10 (or in the course of performing the communication), in step F11, the CPU 7 acquires the current latitude and longitude information detected by the position detection unit 20.

In step F12, the CPU 7 refers to a communication position list stored in the storage region 9 and determines whether or not the current latitude and longitude information has been registered on the communication position list.

When determined that the current latitude and longitude information has been registered on the communication position list, an update process of the communication position list may not be performed, and then the management process of the communication position list ends. In the other hand, when determined that the current latitude and longitude information has not been registered on the communication position list, the process proceeds to step F13, and then the update process of the communication position list is performed by registering an additional latitude and longitude information.

This allows position information (latitude and longitude information) indicating the location to be registered according to the performed short-range wireless communication and allows a location history where the communication has been performed to be stored as the communication position list shown in FIG. 4.

An example of FIG. 5B is performed as follows. In step F20, the CPU 7 controls the short-range wireless communication controller 10 to actually perform a short-range wireless communication.

When the short-range wireless communication is performed in step F20 (or in the course of performing the communication), in step F21, the CPU 7 determines whether or not the communication performed in step F20 is for the purpose of making a backup of contents data, that is, determines whether or not contents data is sending.

When the short-range wireless communication is performed without sending contents data, the management process of the communication position list ends in step F21.

On the other hand, when the short-range wireless communication is performed with sending the contents data, in step F22, the CPU 7 acquires the current latitude and longitude information detected by the position detection unit 20. And then, in step F23, the CPU 7 refers to a communication position list stored in the storage region 9 and determines whether or not the current latitude and longitude information has been registered on the communication position list.

When determined that the current latitude and longitude information has been registered on the communication position list, an update process of the communication position list may not be performed, and then the management process of the communication position list ends. In the other hand, when determined that the current latitude and longitude information has not been registered on the communication position list, the process proceeds to step F24, and then the update process of the communication position list is performed by registering an additional latitude and longitude information.

This allows position information (latitude and longitude information) indicating the location to be registered according to the performed short-range wireless communication for the purpose of making a backup of contents data and allows a location (a location of backup) history where the communication has been performed to be stored as the communication position list shown in FIG. 4.

A control process of a short-range wireless communication by the CPU 7 will be described with reference to FIG. 6.

When the DSC 1 is powered on, the CPU 7 sequentially acquires position information from the position detection unit 20, in step F101. More specifically, the process of FIG. 6 may be sequentially performed at a predetermined interval by the CPU 7. Alternatively, the process may be performed by notifying position information using an interrupt provided from the position detection unit 20.

In step F101, when the CPU 7 acquires the current position information (latitude and longitude information), in step F102, the CPU 7 refers to the communication position list stored, for example, in the storage region 9.

It is determined whether the current latitude and longitude information coincides with any one of the latitude and longitude information registered on the communication position list, in step F103.

When determined that the current latitude and longitude information coincides with any one of the latitude and longitude information registered on the communication position list, the communication is more likely to be performed at this time because the current location is a location where the communication has been performed.

The CPU 7 precedes the process to step F104, and controls a standby radio signal to be in a dense state. More specifically, the CPU 7 instructs the short-range wireless communication controller 10 to generate a standby radio signal of a dense state. According to the instruction, the short-range wireless communication controller 10 causes the standby radio signal to be outputted from the short-range wireless communication antenna 2 in a shortened polling interval.

And then the communication is prepared to initiate. The communication is initiated by the proximity operation of a user.

On the other hand, when determined that the current latitude and longitude information is not registered on the communication position list, the short-range wireless communication device where the communication has been performed is less likely to be placed in the vicinity of the current DSC 1 as a communication counterpart, and thus the communication is less likely to be performed even when the standby radio signal is sent in a dense state. The CPU 7 precedes the process to step F105 and controls the standby radio signal to be in a sparse state. More specifically, the CPU 7 instructs the short-range wireless communication controller 10 to generate the standby radio signal of a sparse state. According to the instruction, the short-range wireless communication controller 10 causes the standby radio signal to be outputted from the short-range wireless communication antenna 2 in a lengthened polling interval.

Figure 6:
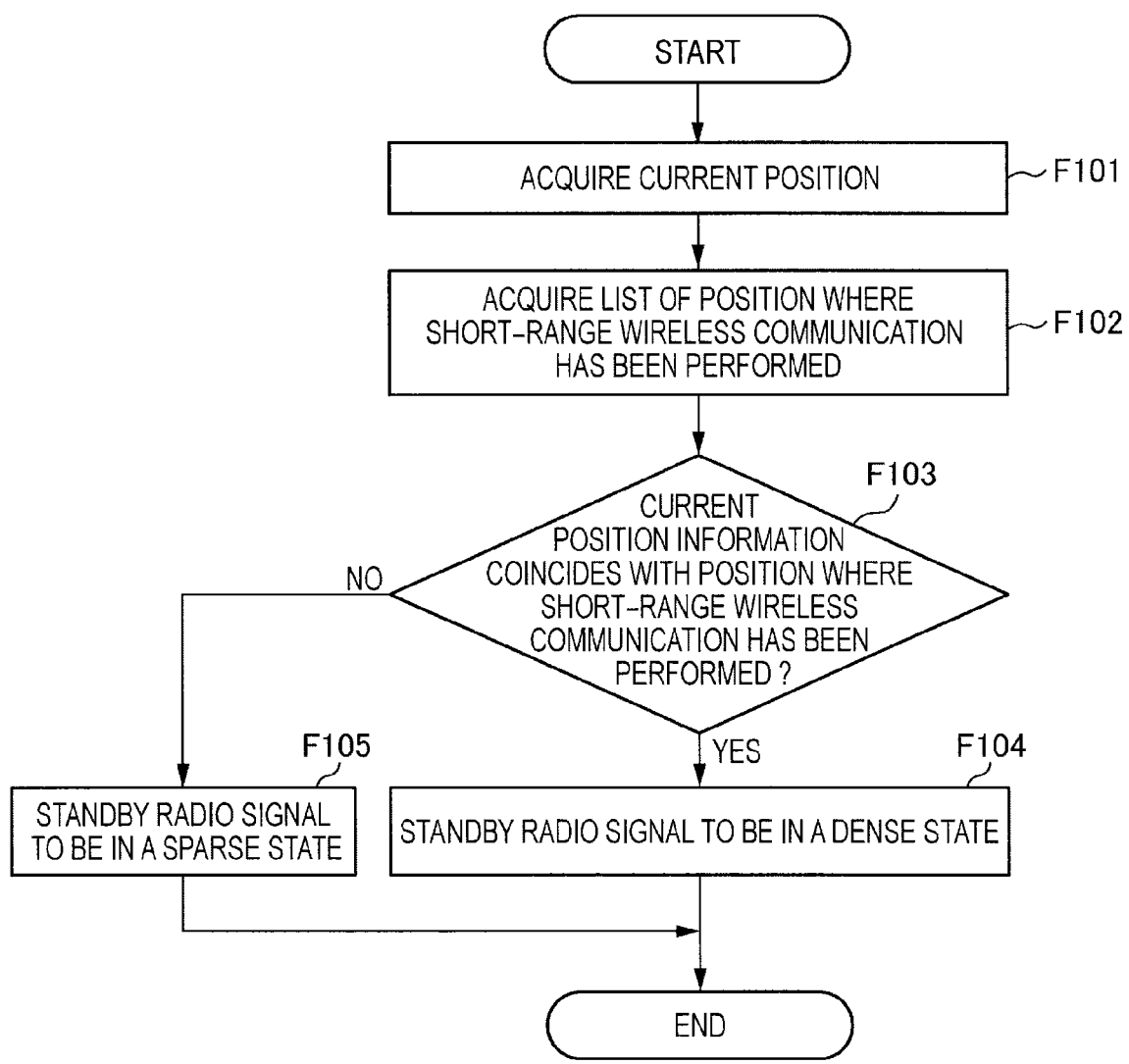
FIG. 6 is a flowchart illustrating a communication control process according to the first embodiment.

The CPU 7 sequentially performs the process of FIG. 6 as described above.

According to the first embodiment, the following advantages can be obtained.

By controlling the standby radio signal to be in a dense state at a location where the short-range wireless communication is more likely to be performed, it makes easier to detect a communication counterpart, and the short-range wireless communication is initiated smoothly.

Meanwhile, at a location where a short-range wireless communication has not been performed, the possibility to perform the communication is low, and thus the standby radio signal becomes a sparse state. Accordingly, power consumption pertaining to the standby radio signal is effectively reduced.

There is little burden placed on the user manipulation according to the locations. Also, the user may not selectively control the generation state of the standby radio signal. As a result, the user's convenience is maintained desirably.

Even though the standby radio signal is generated in a sparse state, the detection of a communication counterpart may be possible. For example, in a case that a user tries to perform a short-range wireless communication at a location where the user has not been communicated, it is possible to detect a communication counterpart and initiate the communication by setting the standby radio signal to be generated in a sparse state not in a stop state. Also, when the communication is actually performed, by registering new latitude and longitude information on the communication position list in the process of FIG. 5, the standby radio signal may be generated in a dense state at that location in subsequent processes.

At a location where a user is less likely to perform a backup communication, indiscriminate initiations of the communication may be reduced by setting the standby radio signal to be generated in a sparse state.

For example, in a short-range wireless communication, there may be a case that contents data is sent unintentionally. But this communication is commonly difficult to happen at a location other than location where the communication is performed.

3. Communication Control Process of Second Embodiment

An operation of the DSC 1 according to a second embodiment will be described.

In the second embodiment, when a user tries to establish a short-range wireless communication between the DSC 1 and the wireless communication device 50, the registrations of latitude and longitude information obtained by the position detection unit 20 on the communication position list is similar to that of the first embodiment.

In the second embodiment, position information at a time of sending the contents data using a short-range wireless communication is registered in a state that the position information is associated with each contents data.

One or more latitude and longitude information at which the short-range wireless communication has been performed for each contents data are registered on the communication position list stored in the storage region 9.

FIG. 8 illustrates an example of a communication position list as a list of latitude and longitude information linked to each contents data.

In the communication position list as shown, the latitude and longitude information of a location where a backup communication has been performed is registered for each contents data CT1, CT2 and so on stored, for example, in the storage region 9 of the DSC 1. The contents data CT1, CT2 and so on, may be considered as identifiers (for example, file names) each indicating a particular contents data. The position information is associated with an identifier of contents data in the communication position list.

In an example shown in FIG. 8, a history indicating that a backup communication has been performed at a location where the latitude is "AAA" and the longitude is "BBB" is registered on the contents data CT1. Further, a history indicating that a backup communication has been performed at two locations where the latitude is "AAA" and the longitude is "BBB" and where the latitude is "CCC" and the longitude is "DDD" is registered on the contents data CT3.

There is no position information associated with the contents data CT2. This indicates that a backup communication has not been performed on the contents data CT2.

When the communication position list shown in FIG. 8 is used, the DSC 1 (CPU 7) can determine whether or not the contents data has been sent to the short-range wireless communication device of a communication counterpart at a location having certain latitude and longitude.

It is possible to predict whether or not any contents data stored in the DSC 1 has been sent to the wireless communication device 50 located in the vicinity of the current position, Thus, when the DSC 1 stores the contents data which has not been sent to the wireless communication device 50 located in the vicinity of the current position, the short-range wireless communication is more likely to be implemented. Therefore, the standby radio signal is sent in a dense state and the initiation of the communication is prepared.

On the other hand, when the DSC 1 does not store the contents data which has not been sent to the wireless communication device 50 located in the vicinity of the current position, the short-range wireless communication is more likely to be performed because the contents data is not intended to be sent. Therefore, even when the standby radio signal is sent in a dense state, the communication is less likely to be performed. The standby radio signal is set to be in a sparse state and the power consumption is reduced.

The communication location of the past is registered on the communication position list for each contents data, it is possible to obtain information of a "location where the communication has been performed" by the communication position list.

Thus, a communication position list indicating only a "location where the communication has been performed" as shown in FIG. 4 may not be necessarily prepared separately.

However, a communication position list indicating a "location where the communication has been performed" as shown in FIG. 4 may be prepared separately.

An operation of the second embodiment will be described in detail as a process example of the CPU 7.

Figure 9:
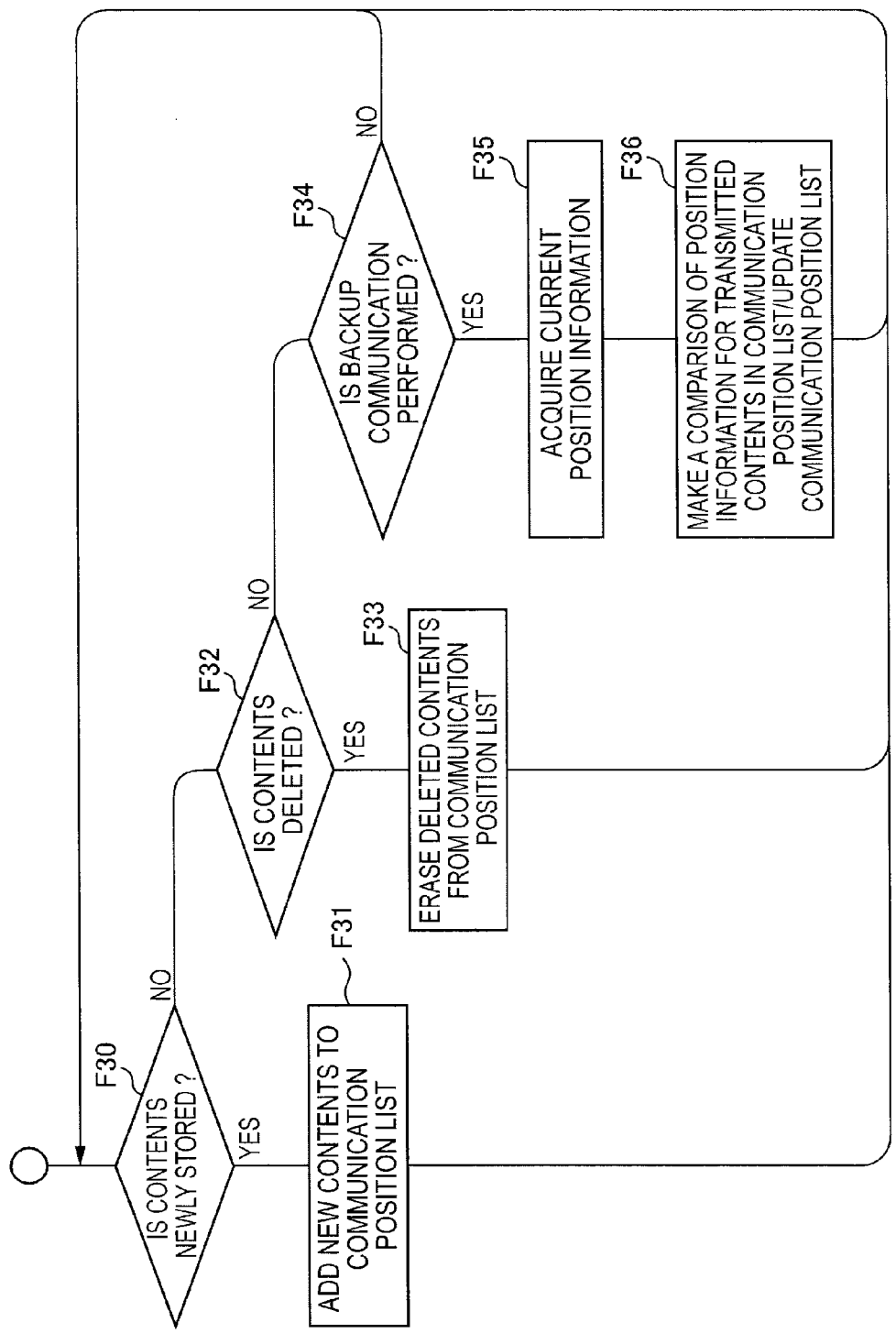
FIG. 9 is a flowchart illustrating a list management process according to the second embodiment.

FIG. 9 illustrates a management process example of a communication position list similar to that of FIG. 8 for registering a location where the communication has been performed for each contents data by the CPU 7.

Flowcharts of FIG. 9 and FIG. 10 (described later) will be described as a control process of the CPU 7 based on a program executed by the CPU 7, but a similar process may be implemented in hardware or a combination of hardware and software.

In the management process of communication position list in FIG. 9, the CPU 7 always makes determinations of steps F30, F32 and F34 and performs a necessary process according to the determinations.

In step F30, it is determined whether additional contents data is newly stored in the DSC 1.

For example, when a user captures a still or moving image using the DSC 1, a still or moving data file is newly stored in the storage region 9. This may be a new storage of contents in step F30. Contents data such as a still image data file is provided to the DSC 1 and is stored in the storage region 9, by a communication with other device in a wired or wireless manner, a network download, or reading out from a recording medium such as loaded memory card or optical disk. This case may be also corresponded to a new storage of contents.

For example, in step F30, the CPU 7 monitors that contents data intended to be made a backup communication by a short-range wireless communication is newly stored in the DSC 1.

In a new storage of contents, as the list management process of the CPU 7, the process proceeds from step F30 to step F31 and an updating of the communication position list is performed. An identifier (CTx) of newly stored contents data is newly registered on the communication position list.

In this time, a backup communication for the contents data is not performed, and thus the contents data is not associated with position information, like a contents data CT2 shown in FIG. 8 and only the identifier is added to the communication position list.

For example, contents data stored in the storage region 9 is deleted according to a delete operation of a user.

Subsequent backup communications are not performed on the deleted contents data, and thus the deleted contents data may not be registered on the communication position list.

When contents data is deleted, the process proceeds from step F32 to step F33, and an entry of the deleted contents data is erased from the communication position list, as the list management process of the CPU 7.

When one or more contents data are transmitted for backup as a short-range wireless communication, the list management process of the CPU 7 proceeds from step F34 to step F35.

In step F35, the CPU 7 acquires the current latitude and longitude information which is detected by the position detection unit 20.

In step F36, the CPU 7 performs an updating of the communication position list, as necessary. That is, the CPU 7 determines whether or not the current position information is registered on the communication position list for each contents data intended to be made a backup communication. If there is contents data not associated with the current position information among the transmitted contents data, then the current position information is additionally registered in association with the contents data.

According to the process of FIG. 9, the updating process is performed so that a location where a backup process has been performed with a short-range wireless communication may be registered on the communication position list shown in FIG. 8.

A control process of a short-range wireless communication by the CPU 7 will be described with reference to FIG. 10.

When the DSC 1 is powered on, the CPU 7 sequentially acquires position information from the position detection unit 20, in step F201. In the process of FIG. 10, the CPU 7 may sequentially acquire the position information in a given interval or the position detection unit 20 may notify the position information using an interruption signal to the CPU 7.

When the CPU 7 acquires the current position information (latitude and longitude information) in step F201, the CPU refers to the communication position list stored in the storage region 9, in step F202 and step F203.

In step F202, the communication position list registered with a location where the communication has been performed as shown in FIG. 4 is referred to. In step F203, the communication position list registered with a location where the backup communication has been performed for each contents data as shown in FIG. 4 is referred to.

The communication position list in FIG. 8 allows information related to a location where the communication has been performed to be obtained. As a result, the communication position list such as that shown in FIG. 8 may not be provided. Also, step F202 may not be performed. Instead, in step F203, the communication position list of FIG. 8 may be referred to.

When the communication position list of FIG. 8 is managed like the process of FIG. 9 and the registration details are erased according to the deletion of contents data, information related to a location where the communication has been performed may be lost. For this reason, it is meaningful to provide a communication position list on which only communication location is registered, as shown in FIG. 4.

In step F204, the CPU 7 determines whether or not the current latitude and longitude information is coincided with any latitude and longitude information registered on the communication position list.

For example, the CPU 7 determines whether or not the current latitude and longitude information is registered on the communication position list of FIG. 4. The CPU 7 may also determine whether or not the current latitude and longitude information is coincided with any one of the latitude and longitude information associated with any contents data in the communication position list of FIG. 8.

When determined that the current latitude and longitude information is coincided with latitude and longitude information registered on the communication position list. The current location may be a location where the short-range wireless communication has been performed. In this case, the CPU 7 proceeds to step F205.

In step F205, the communication position list shown in FIG. 8, that is the list of latitude and longitude information of a location where the short-range wireless communication has been performed for each contents data is used. It is determined whether or not there is contents data in which the current latitude and longitude information is not coincided with latitude and longitude information of a location where the short-range wireless communication has been performed.

In other words, it is determined whether or not there is contents data in which backup communication has been not performed at the current location.

If there is any one contents data corresponding to this case, a short-range wireless communication is more likely to be performed for the wireless communication device 50 which will be existed in the vicinity in the near future.

The CPU 7 proceeds to step F206 and sets the standby radio signal to be in a dense state. More specifically, the CPU 7 instructs the short-range wireless communication controller 10 to set the standby radio signal to be generated in a dense state. According to the instruction, the short-range wireless communication controller 10 causes the standby radio signal to be outputted from the short-range wireless communication antenna 2 in a shortened polling interval.

According to this, the initiation of the communication is prepared. The communication is initiated by a proximity operation of a user.

Meanwhile, if the current latitude and longitude information is not registered on the communication position list or if there is no contents data which is not coincided with latitude and longitude information of a location where the short-range wireless communication has been performed (when there is no contents data in which backup communication has been not performed at the current location), then the CPU 7 proceeds to step F207.

This case is corresponded to a state that there is less likely to be a short-range wireless communication device in which the communication has been performed in the vicinity of the current DSC 1 as a communication counterpart (F204→F207) or a state that all existing contents data has been sent to the wireless communication device 50 which will be existed in the vicinity (F205→F207).

Thus, this case is corresponded to a state which is not a location to communicate or a state that it is less necessary to send contents data although the communication is possible to communicate. For this reason, although the standby radio signal is sent in a dense state, it can be considered that a case of performing a user proximity operation and performing the communication is less happened. Therefore, the standby radio signal is set to be in a sparse state, thereby reducing the power consumption.

More specifically, the CPU 7 instructs the short-range wireless communication controller 10 to set the standby radio signal to be generated in a dense state. According to the instruction, the short-range wireless communication controller 10 causes the standby radio signal to be outputted from the short-range wireless communication antenna 2 in a lengthened polling interval.

Figure 10:
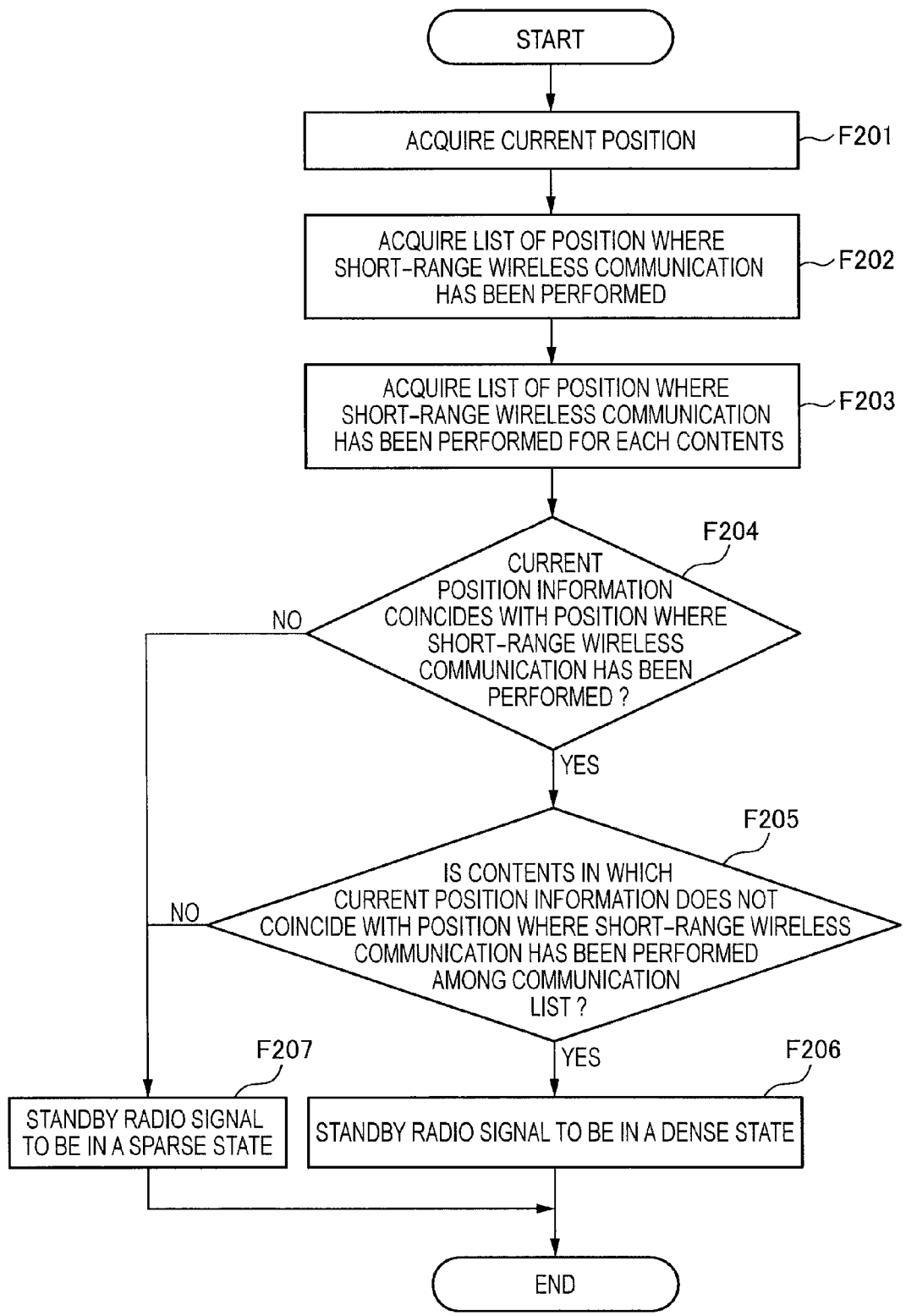
FIG. 10 is a flowchart illustrating a communication control process according to the second embodiment.

The CPU 7 sequentially performs the process of FIG. 10 described above. In the second embodiment, a possibility to perform the communication is determined and the standby radio signal is controlled, using a history of a communication location for each contents data in a short-range wireless communication for backup transfer of contents data.

If the standby radio signal is in a dense state, then a possibility to perform the backup communication of contents data is high. Thus, it makes easier to detect a communication counterpart, and the short-range wireless communication is initiated smoothly.

In the other hand, if the standby radio signal is in a sparse state, then a possibility to perform the backup communication of contents data is low. Thus, the power consumption related to the standby radio signal is effectively reduced.

A history of a location where the transmission has been performed for each contents data also is determined, and thus the determination of communication possibility is more exactly performed than the first embodiment. For this reason, the performing of communication and the reduction of power consumption are effectively achieved.

A user is not burdened with a manipulation to adjust the standby radio signal, thus convenience of the user is maintained.

In the second embodiment, even though the possibility to perform the communication is low, the standby radio signal is set to be in a sparse state. Thus, there is no case that the communication is not performed at all. As a result, if it is necessary to perform the communication, the communication is performed.

In the other hand, by being difficult to detect a communication counterpart, it is possible to prevent the contents data from indiscriminately being sent by a short-range wireless communication.

4. Modification Example

While certain embodiments have been described, the configuration of the communication apparatus and communication control process of the present disclosure are not limited, and various modification examples are possible.

In the above-mentioned embodiments, when determined that the possibility to perform the short-range wireless communication is low, the standby radio signal is set to be in a sparse state, but it is also possible that the standby radio signal is set to be in a stop state rather than the sparse state.

The stop state means that the generation of the standby radio signal is completely ceased. In this case, the communication counterpart may be not detected, but the power consumption may be significantly reduced.

However, in this case, at a location which is not registered on the communication position list, the short-range wireless communication is not performed.

It is suitable for a use case that a location where the backup of contents data is performed is registered on the communication position list, such as a user's home and the communication is not performed only at that location.

If the standby radio signal is set to be in a stop state at a location other than the registered location, any unintended communication at a location other than the registered location may be effectively prevented, thus it is effective in a case necessary for avoiding data leakage.

The process for managing the communication position list shown in FIG. 4 or FIG. 8 is performed in various manners. For example, the communication position list shown in FIG. 4 may stores the latest date at which the communication is performed. A process for erasing the position information in which the communication is not performed for a given long period of time may be performed.

The date and time or the number of times of communication for each of the position information is stored. The polling interval of the standby radio signal may be adjusted.

For example, a dense state may be divided into a first dense state where the polling interval is the shortest and a second dense state where the polling interval is slightly lengthened but not enough to be a sparse state. Therefore, the standby radio signal may be controlled in a multi-stage manner. As an example, a location where the number of times of communication is large or a location where the communication has been performed is set to be in the first dense state; in other cases, the second dense state is used.

In the above-mentioned embodiments, although the DSC 1 is described as an example of the communication apparatus, an example of the communication apparatus is not limited to the DSC 1. The communication apparatus of the present disclosure may be implemented in various devices.

For example, examples of the devices include portable phones, video camera devices, mobile terminal devices, portable game devices, information processing devices, portable music playback devices or similar devices. From the viewpoint of controlling the standby radio signal to determine the current position, a portable compact device is suitable; it is not necessarily limited thereto.

When various devices of the present disclosure are implemented as the communication apparatus 100, these devices may be configured to include a configuration of FIG. 11.

FIG. 11 shows a control unit 101, a position detection unit 102, a short-range wireless communication controller 103, a short-range wireless communication antenna 104, and a storage unit 105.

The short-range wireless communication controller 103 and the short-range wireless communication antenna 104 are provided as a short-range wireless communication unit for performing the short-range wireless communication with an external communication device.

The position detection unit 102 is configured to detect a current position.

The storage unit 105 stores a communication position list.

The control unit 101 controls the detection of current position and the standby operation for the short-range wireless communication controller 103 according to the obtained information from the position detection unit 102. That is, the control unit 101 acquires current position information from the position detection unit 102, and controls a generation state of a standby radio signal from the wireless communication unit 103 and 104 in accordance with a comparison result obtained by comparing the acquired current position information with the communication position list stored in the storage unit 105.

Furthermore, the control unit 101 performs a list management process for allowing position information at a time of performing the communication to be registered on the communication position list.

The above-mentioned portable phones, video camera devices, mobile terminal device or similar devices are, in addition to the configuration for the main function, corresponded to the communication apparatus of the present disclosure by including the configuration of FIG. 11.

Additionally, the present technology can also be configured as below.
(1) A communication apparatus including:
a short-range wireless communication unit for performing a short-range wireless communication with an external communication device;
a position detection unit for detecting current position information;
a storage unit for storing a communication position list registering therein position information at a time of performing the short-range wireless communication; and
a control unit for acquiring the current position information from the position detection unit and for controlling a generation state of a standby radio signal from the short-range wireless communication unit in accordance with a comparison result obtained by comparing the acquired current position information with the communication position list.
(2) The communication apparatus according to (1),
wherein, if the current position information is a location which is registered on the communication position list according to the comparison result of the current position information and the communication position list, the control unit controls generation of the standby radio signal from the short-range wireless communication unit to be in a dense state, and
wherein, if the current position information is not a location which is registered on the communication position list according to the comparison result, the control unit controls generation of the standby radio signal from the short-range wireless communication unit to be in a sparse or stop state.
(3) The communication apparatus according to (1) or (2),
wherein, in a case the short-range wireless communication is performed with the external communication device by the short-range wireless communication unit, the control unit performs a list management process for enabling position information at a time of the communication to be registered on the communication position list.
(4) The communication apparatus according to (1) or (2),
wherein, in a case the short-range wireless communication for the purpose of sending contents data is performed with the external communication device by the short-range wireless communication unit, the control unit performs a list management process for enabling position information at a time of the communication to be registered on the communication position list.
(5) The communication apparatus according to (1),
wherein the communication position list registers position information at a time of sending contents data by the short-range wireless communication unit, the registration being performed in a state where the position information is associated with each of the contents data,
wherein, if contents data whose associated position information is not coincident with the current position information exists in the communication position list according to the comparison result of the current position information and the communication position list, the control unit controls generation of the standby radio signal from the short-range wireless communication unit to be in a dense state, and
wherein, if contents data whose associated position information is not coincident with the current position information does not exist in the communication position list according to the comparison result, the control unit controls generation of the standby radio signal from the short-range wireless communication unit to be in a sparse or stop state.
(6) The communication apparatus according to (1) or (5),
wherein, in a case the short-range wireless communication for the purpose of sending contents data is performed with the external communication device by the short-range wireless communication unit, the control unit performs a list management process for enabling position information at a time of the communication to be registered on the communication position list as position information associated with the sent contents data.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2011-152747 filed in the Japan Patent Office on Jul. 11, 2011, the entire content of which is hereby incorporated by reference.

What is claimed is:
1. A communication apparatus configured for:
performing a short-range wireless communication with an external communication device;
detecting current position information of the communication apparatus;

storing a communication position list registering therein position information history of the communication apparatus where the short-range wireless communication has been performed;

acquiring the current position information and controlling a generation state of a standby radio signal, for performing the short-range wireless communication with the external communication device, in accordance with a comparison result obtained by comparing the acquired current position information of the communication apparatus with the position information history of the communication apparatus registered in the communication position list;

registering position information at a time of sending contents data, where registration being performed in a state where the position information is associated with each of the contents data, wherein, if contents data whose associated position information is not coincident with the current position information exists in the communication position list according to the comparison result of the current position information and the communication position list, controlling generation of the standby radio signal to be in a dense state, and controlling generation of the standby radio signal to be in a sparse or stop state if contents data does not exist in the communication position list.

2. The communication apparatus according to claim 1, wherein, if the current position information is a location which is registered on the communication position list according to the comparison result of the current position information and the communication position list, the control unit controls generation of the standby radio signal from the short-range wireless communication unit to be in a dense state, and wherein, if the current position information is not a location which is registered on the communication position list according to the comparison result, the control unit controls generation of the standby radio signal from the short-range wireless communication unit to be in a sparse or stop state.

3. The communication apparatus according to claim 1, wherein, in a case the short-range wireless communication is performed with the external communication device by the short-range wireless communication unit, the control unit performs a list management process for enabling position information at a time of the communication to be registered on the communication position list.

4. The communication apparatus according to claim 1, wherein, in a case the short-range wireless communication for the purpose of sending contents data is performed with the external communication device by the short-range wireless comparison result obtained by comparing the acquired current position information of the communication apparatus with the position information history of the communication apparatus registered in the communication position list.

5. The communication apparatus according to claim 1, wherein, in a case the short-range wireless communication for the purpose of sending contents data is performed with the external communication device, performing a list management process for enabling position information at a time of the communication to be registered on the communication position list as position information associated with the sent contents data.

6. The communication apparatus according to claim 1,
wherein the short-range wireless communication unit periodically transmits the generated standby radio signal to the external communication device, and wherein a period interval, at which the short-range wireless communication unit periodically transmits the generated standby radio signal, varies in accordance with a state of the generated standby radio signal.

7. A communication control method of controlling a communication apparatus for performing a short-range wireless communication with an external communication device, detecting current position information, and storing a communication position list registering therein position information history of the communication apparatus where the short-range wireless communication has been performed, the method comprising:

acquiring the current position information of the communication apparatus;

controlling a generation state of a standby radio signal, for performing the short-range wireless communication with the external communication device, in accordance with a comparison result obtained by comparing the acquired current position information of the communication apparatus with the position information history of the communication apparatus registered in the communication position list;

registering position information at a time of sending contents data, where registration being performed in a state where the position information is associated with each of the contents data, wherein, if contents data whose associated position information is not coincident with the current position information exists in the communication position list according to the comparison result of the current position information and the communication position list, controlling generation of the standby radio signal to be in a dense state, and controlling generation of the standby radio signal to be in a sparse or stop state if contents data does not exist in the communication position list.

* * * * *